United States Patent Office 3,759,681
Patented Sept. 18, 1973

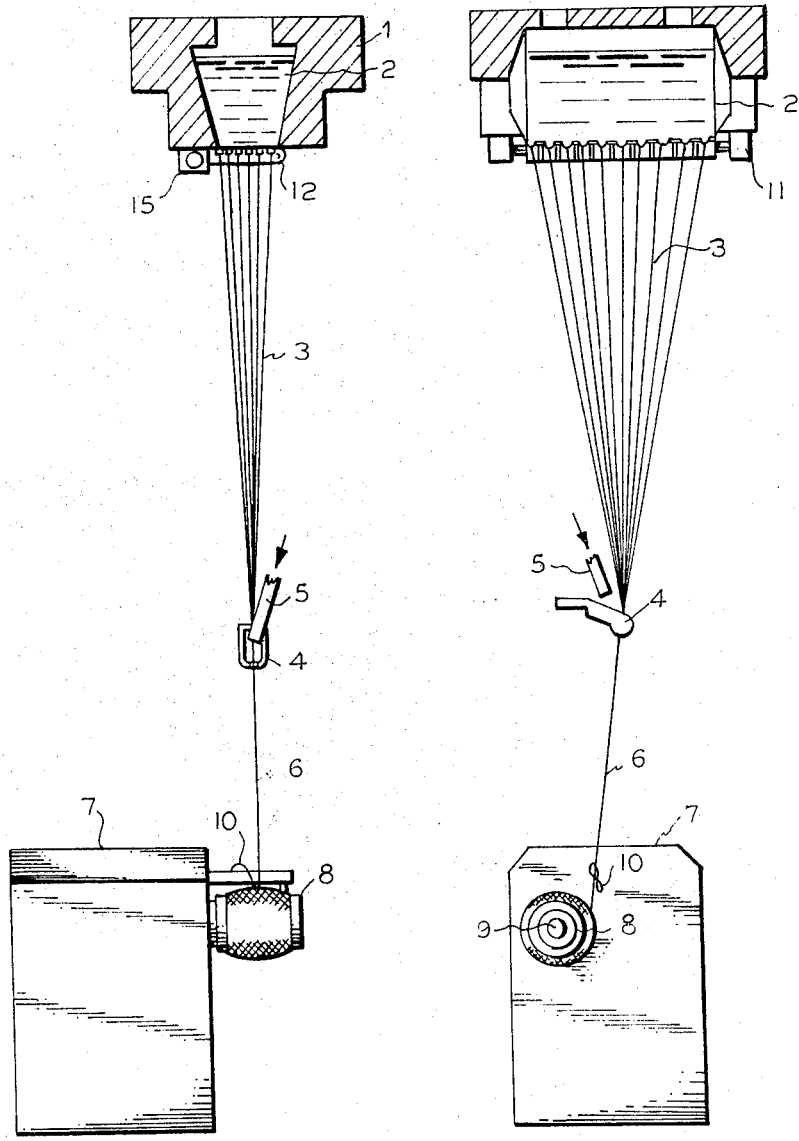

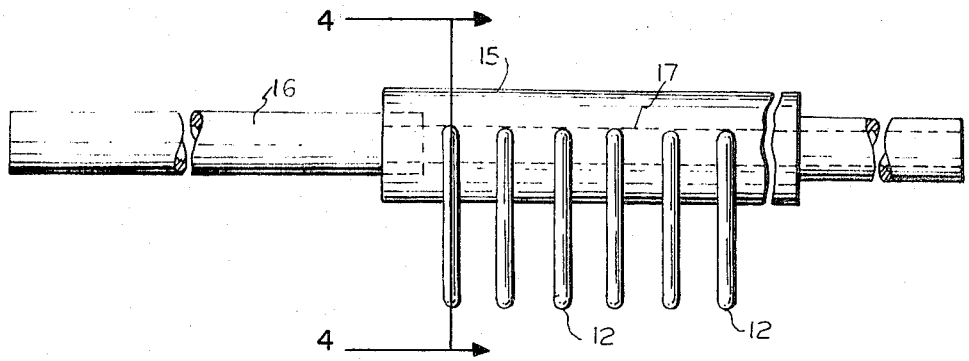
FIG. 3
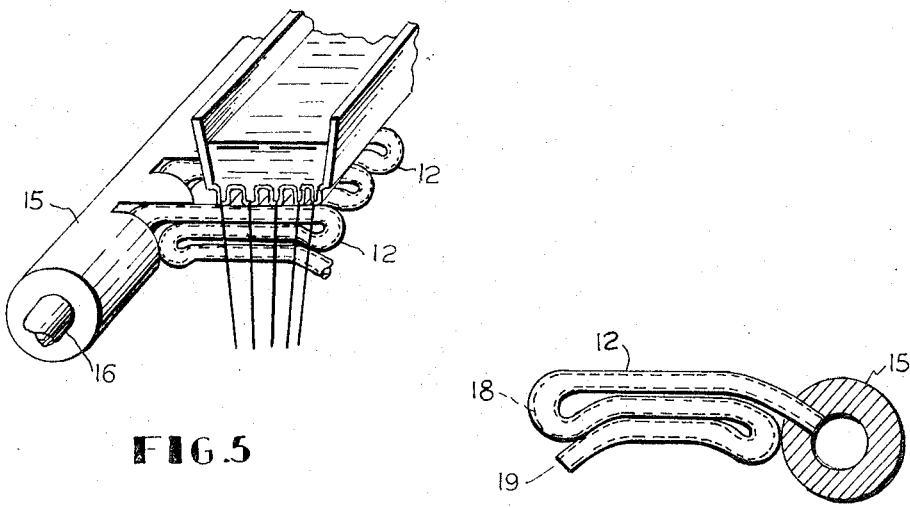
FIG. 5
FIG. 4
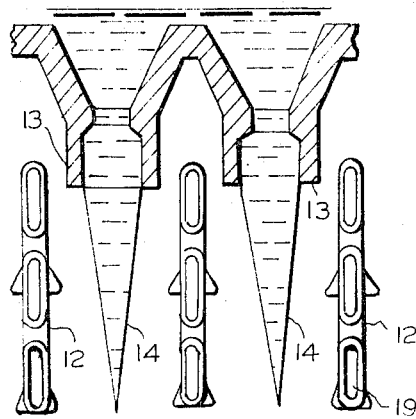
FIG. 6

3,759,681
COOLING MEANS FOR FORMING
GLASS FIBERS
Stanley K. Russell, Hermitage, Tenn., assignor to Ferro
Corporation, Cleveland, Ohio
Filed July 11, 1972, Ser. No. 270,842
Int. Cl. C03b 37/02
U.S. Cl. 65—12                                4 Claims

ABSTRACT OF THE DISCLOSURE

In an apparatus for the manufacture of glass monofilaments from a feeder of molten glass, a series of open ended, fluid-conductive fins, with a source of fluid connected thereto, whereby a liquid coolant, preferably water, continuously fed to said fins under pressure, passes through them and is discharged from said open ends as vapor, due to the heat of the monofilaments being drawn from between said fins, to thereby provide a cooling effect in the area of said monofilaments.

---

The invention is described particularly in connection with the production of continuous glass fibers wherein streams of molten glass are attenuated mechanically into continuous fibers of small diameter which are then gathered into a strand and wound into a package. Fibers thus produced are then usually processed into other textile forms such as yarns, cords, roving, etc. on conventional textile machinery for subsequent use in ever-widening fields of application.

THE PRIOR ART

The art of attenuating glass monofilaments from a molten source thereof for subsequent reprocessing into intermediate or final items of commerce is well-known and documented in the art; for example, see U.S. Pat. No. 2,908,036 to Russell, particularly columns 1 and 2 thereof and column 3 thereof, lines 1–62, see also U.S. Pat. No. 3,518,069 to Cole, both of which are incorporated herein by reference. It will be apparent that the basic objectives of Russell and Cole were substantially the same as those of this invention, and these disclosures are incorporated herein by reference.

The prior art has thus disclosed many methods of stabilizing and cooling glass cones in the manufacture of fiber glass filaments.

However, the effectiveness of the devices of the Russell disclosures is not nearly so great as that of the instant invention, for the reason that solid fins, even though directly connected to a water-cooled header, are simply unable to dissipate heat as rapidly as the device of the instant invention.

One of Russell's disclosures depicts jets of water actually being directed between cones. But this has the drawback of creating a relatively high volume of moisture and steam in the immediate vicinity of the cones which is detrimetal to the quality of the glass.

Russell also teaches the use of a fin which diffuses gas under pressure to accomplish cooling, while Cole teaches the use of a permeable fin to evaporate water by a capillary action.

However, the fin of Cole is considered more difficult to fabricate than the device of the instant invention. Too, a uniform rate of evaporation from the Cole fin could be severely hampered by progressively heavier deposits of salts from a "hard" water supply.

By contrast, the device of the instant invention provides a steady, relatively high volume of flow of cooling liquid through each fin and, because of the positive expulsion of water vapor from the open end of the instant cooling fin, the likelihood of buildup due to utilization of hard water is materially reduced.

Referring to the attached drawings, FIG. 1 is a side elevation view of a general layout of apparatus including shielding components for production of continuous glass fibers in accordance with the present invention;

FIG. 2 is a front elevation view of the apparatus of FIG. 1;

FIG. 3 is an enlarged plan view of the header and fins of the present invention;

FIG. 4 is a section through 4—4 of FIG. 3;

FIG. 5 is a perspective view of the instant cone shielding arrangement shown as positioned with respect to emergent cones of glass; and FIG. 6 is an enlarged cross-sectional view of a pair of feeder tips with cone shielding fins on both sides of each tip.

Referring now more particularly to the drawings, FIGS. 1 and 2 illustrate a refractory furnace 1 for reducing a body of glass to molten condition having a bushing or feeder 2 associated therewith from which a plurality of streams of molten glass are emitted from orifices in the feeder tips for attenuation into monofilament fibers 3. The fibers are drawn to a gathering member 4 at which they are gathered and at which sizing fluid may be applied to the fibers as it is supplied from a tube 5 connected to a reservoir not shown. The strand 6 formed of the gathered fibers is packaged by a winder 7 which collects a strand on a tube 8 mounted on a rotating collet 9 and traversed by a suitable traversing device such as a spiral wire traverse 10. The winder provides the force of attenuation for the fibers by reason of rotation of the collet which develops tension in each fiber to withdraw it from the molten glass flowing from the feeder. Each of said molten glass streams immediately upon emergence from said orifices, by virtue of said attenuating means, presents generally a coniform shape which converges, at its lower extremity, to a monofilament, which solidifies prior to the gathering point 4, where it joins other monofilaments to form a strand. A cone shielding unit 11 provides a plurality of shield members in the form of fluid-conductive, blade-like fins 12 each extending across the width of the feeder between feeder tips 13. The orientation of the thin blade-like fins 12 across the under part of the feeder with feeder tips aligned therebetween may be seen more clearly in FIGS. 4, 5 and 6, which illustrate that the tips 13 and the cones 14 (FIG. 6) emitted therefrom are, in effect, shielded from each other by said fins.

In the preferred embodiment shown, two rows of feeder tips 13, when viewed transverse to the long axis of feeder 2, are embraced by a pair of fins, although this may be varied depending upon prevailing requirements and conditions at the time.

The fins 12 extend from a longitudinal, hollow, fluid-cooled manifold or header 15 disposed laterally with respect to the feeder structure. Cool water or other suitable liquid coolant is supplied continuously through said header by suitable means such as tubing or other conduit 16. Water, as a preferred fluid, is fed to one end of the header and passed through a hollow channel 17 therewithin, passing longitudinally through the header and emitted from the opposite outlet end at a slightly higher temperature, due to heat being absorbed during passage through the header, which in turn absorbs heat directly from the adjacent, molten glass cones and via communicating fins 12. The water can be passed through the channel 17 at a controlled rate of flow and pressure and at temperatures predetermined to establish desired temperature differentials between the fins and the glass emitted from the feeder tips.

Although mounting means is not shown, any suitable means, well-known in the art, may be utilized for mounting the header and fluid conductive fins of this invention, in such a manner that when in operating position, the fins 12 are so positioned that the upper edge of each is at a level slightly above the bottom of the tips with which it is associated while its bottom edge extends downwardly to the level of the apex of the cones emitted from the tip orifices.

As is well-known, to assure uniformity of filamentation, the cone shields of this invention stabilize the cones from which monofilaments are attenuated by controlling absorption of heat from the glass on emergence from the feeder tip and to thereby promote a viscosity of the glass which promotes stability thereto during filamentation and by reducing the disrupting, erratic effects of air currents in the vicinity of the cones as may be caused by both variation in the glass and ambient temperatures and by motions of the glass itself as it rapidly passes into filamentation.

The composition of glasses suitable for the application of this invention are well-known in the art and documented in prior patents, including the patent to Russell discussed above and need not be repeated here.

The improvement contemplated by this invention is the provision of stabilizing fins 12 composed of an open-ended, fluid conductive material to thereby enhance and improve the stabilization and cooling qualities of a device of the general character herein described.

Referring to FIGS. 4 and 6, linear fin channel 18, communicating with channel 17, will be seen to extend back and forth the entire length of cooling fin 12. Fluid passing under pressure through channel 17 flows through fin channel 18 to thereby provide a head of fluid the entire length of cooling fin 12. Cooling fin 12, being made of highly heat conductive metal, permits a rapid cooling effect caused by conductance of heat away from the area of molten glass cones, in that the heat of the glass cones, in close proximity to the fins, causes rapid and continuous explusion of vaporized fluid from the open end of said fins.

In the preferred embodiment set forth in the drawings, serpentine fin 12, generally of a somewhat squashed "S" configuration, is readily formed by bending a piece of copper, or other highly conductive metal, tubing into a tight "S" shape as shown, then flattening the tubing in a suitable press, to a predetermined degree, to reduce the formerly, circular channel extending therethrough, to a relatively tight slit as depicted in cross section in FIG. 6.

In operation then, water under pressure passing through header 17, develops water under pressure in channels 18 of fins 12. An operator may quickly adjust the pressure in any number of ways, most simply by reducing the volume of cooling fluid passing through header 17 by adjustment of a hand valve, until such time as any readily visible droplets or spurts of water, out of open-end 19 of fins 12 is eliminated, and the water passing therethrough is emerging as barely visible jets of vapor.

It is to be understood that, although in the embodiment depicted in the attached drawings, the channel 18 provides three vertically disposed, generally linear passages, the fin could conceivably be formed with one single passage, or four, five or more doubling back-and-forth upon themselves.

Nor is it essential that the open end of the fin discharge in a direction away from the header; it may discharge rearwardly toward the header, or downwardly.

The header also may be manufactured by flattening a single, relatively large piece of tubing so that channel 18 is substantially straight, with the fluid passing in a substantially straight line from header 17 through a single passage flattened fin, and out the constricted opening at its opposite end in the form of vapor.

I claim:

1. In an apparatus for producing glass monofilaments comprising a feeder, for feeding molten glass, said feeder having projecting tips extending from an under surface thereof, said tips being aligned generally in rows, each said tip having an orifice centrally located therein from which a stream of molten glass is emitted, means for attenuating said streams into monofilaments, each of said streams immediately upon emergence from said orifices, by virtue of said attenuating means, being generally coniform and convergent to a monofilament at their lower extremities, environmental control means associated with said feeder comprising thin, longitudinal fin members arranged in side-by-side generally parallel relationship disposed between rows of emergent cones, liquid-cooling means comprising a liquid-cooled header to which each of said fins is affixed for positioning and support, the improvement in association therewith of said fins having an internal, two-ended cooling fluid circulating passage running the length thereof, one end of said passage communicating with said header and adapted to receive coolant therefrom, the other end of said passage open to the atmosphere, and means for maintaining a lower cooling liquid volume flow within said passage as compared to that within said header to provide both conductive removal of heat from said fins and removal of heat therefrom via continuous vaporization of said liquid from the open end of said fins to thereby effect a desired and improved degree of cooling of same.

2. The improvement of claim 1 wherein said passage is of a generally condensed "S" configuration, and the means for maintaining lower volume flow in said passage is a constriction thereof reducing its cross-sectional area at a given point to a value substantially smaller than that of said header.

3. The improvement of claim 1 wherein said passage is of a generally condensed "U" configuration, and the means for maintaining lower volume flow in said passage is a constriction thereof reducing its cross-sectional area to a value substantially smaller than that of said header.

4. The improvement of claim 1 wherein said passage is substantially straight.

References Cited
UNITED STATES PATENTS

| | | | |
|---|---|---|---|
| 3,285,723 | 11/1966 | Levecque et al. | 65—12 X |
| 3,345,147 | 10/1967 | Russell | 65—12 X |
| 3,518,069 | 6/1970 | Cole | 65—2 |

ROBERT L. LINDSAY, JR., Primary Examiner